(12) United States Patent
Takei

(10) Patent No.: US 6,437,877 B1
(45) Date of Patent: Aug. 20, 2002

(54) PRINT DATA PROCESSING METHOD AND APPARATUS

(75) Inventor: Kenichi Takei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/233,090

(22) Filed: Jan. 19, 1999

(30) Foreign Application Priority Data

Jan. 19, 1998 (JP) .......................................... 10-008043

(51) Int. Cl.[7] .......................... H04N 1/405; G06K 15/02
(52) U.S. Cl. ........................ 358/1.9; 358/456; 358/457; 382/252
(58) Field of Search .......................... 358/1.9, 456, 458, 358/459, 460, 298, 534, 457, 466, 535, 406, 504; 382/252, 270

(56) References Cited

U.S. PATENT DOCUMENTS 5,243,443 A  9/1993  Eschbach .................... 358/455
5,321,525 A  6/1994  Hains .......................... 358/456
5,469,267 A * 11/1995  Wang .......................... 358/298

FOREIGN PATENT DOCUMENTS

| JP | 5-252386 | 9/1993 |
| JP | 6233121 | 8/1994 |
| JP | 8-298595 | 11/1996 |

* cited by examiner

Primary Examiner—Scott Rogers
(74) Attorney, Agent, or Firm—Foley & Lardner

(57) ABSTRACT

A print data processing technique for a printer device is disclosed. There has been stored error data in halftone level between an actual halftone characteristic of the printing device and a target halftone characteristic. After dividing input print data into halftone cells of a predetermined pattern to produce halftone-cell data for each of the halftone cells, the error data of a halftone cell is sequentially diffused over halftone-cell data of another halftone cell using a predetermined distribution ratio from the halftone cell to the other halftone cell to correct halftone-cell data of each of the halftone cells. Dither data of each of the halftone cells is produced from corrected halftone-cell data thereof.

12 Claims, 5 Drawing Sheets

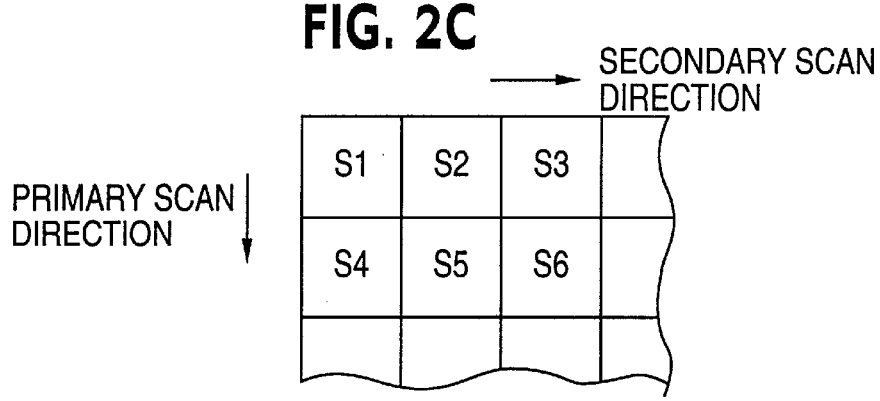

IDEAL DEVELOPMENT

ACTUAL DEVELOPMENT

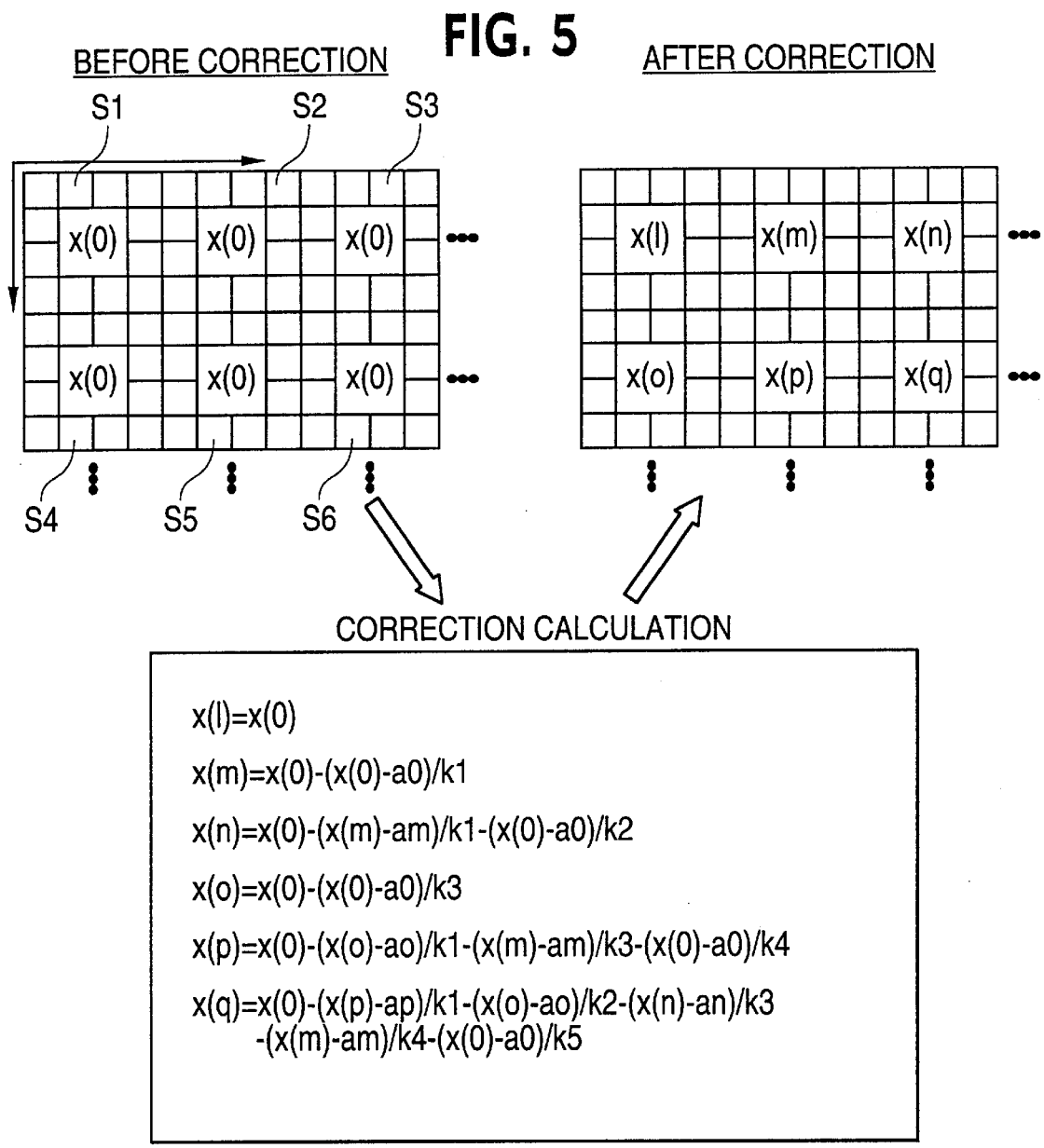

DITHER PATTERN TO BE PRINTED

ACTUAL DEVELOPMENT

PRINT DATA PROCESSING METHOD AND APPARATUS

BACKGROUND OF THE INVENTION

1. Field of the Invention

The present invention relates to print data processing techniques and in particular to print data processing method and apparatus which convert print data to two-level or binary data for printing with halftone reproducibility.

2. Description of the Related Art

There have been proposed various print data processing techniques for reproducing halftones in, for example, an electrophotographic printing device. One of such techniques employs a halftoning scheme which involves amplitude modulation screening as proposed in, for example, Japanese Patent Application Laid-open Publication No. 5-252386 and another one employs an error diffusion scheme involving frequency modulation screening as proposed in, for example, Japanese Patent Application Laid-open Publication No. 8-298595.

The halftoning scheme sets threshold values dot by dot, and compares input data with the threshold values dot by dot to thereby form halftone cells. Since the halftoning scheme generally carries out development while increasing the number of dots outward from the center, it matches the developing characteristic of the electrophotography technique.

The error diffusion scheme, by way of comparison, acquires the binary error of a specific pixel and distributes the error over other pixels around that specific pixel in accordance with the computed densities by using weights which have been obtained empirically. Theoretically, this error diffusion scheme can freely provide a halftone level.

However, the halftoning scheme requires the increased size of halftone cell in order to increase the number of displayable halftone levels, so that the print result is likely to have graininess or a dispersed-dot appearance. Reducing the sizes of halftone cells to decrease the degree of such graininess however causes the number of displayable halftone levels to be reduced, thereby degrading the print quality.

On the other hand, the error diffusion scheme suffers such a shortcoming that a low-density portion is not easily developed due to dot diffusion while a high-density portion becomes dark due to interference of a photosensitive body and is thus easily developed. The contrast of the print result therefore gets too high. In addition, because of the necessity to compute an error dot by dot, the error diffusion scheme would take a longer processing time than the halftoning scheme.

The conventional technique disclosed in the aforementioned Japanese Patent Application Laid-open Publication No. 8-298595 has not yet overcome the inherent problem of the error diffusion scheme of developing a high-density portion darker while having improved the dot-diffusion originated reduction in the density of a low-density portion. Further, since the error diffusion scheme does not consider the dot gain at the time of development after diffusing an error over input data, it is expected that the number of displayable halftone levels in actual printing becomes smaller than the theoretical value.

The conventional technique disclosed in the aforementioned Japanese Patent Application Laid-open Publication No. 5-252386 has not yet succeeded in shortening the processing time in error diffusion for each halftone cell.

SUMMARY OF THE INVENTION

Accordingly, it is an object of the present invention to provide a print data processing method and apparatus which overcomes the aforementioned drawbacks and can ensure high-quality printing with improved halftone reproducibility and less graininess or dispersed-dot appearance, can ensure stable print quality secure and can improve the printing speed.

According to the present invention, a print data processing method for a printing device includes the steps of a) storing error data in halftone level between an actual halftone characteristic of the printing device and a target halftone characteristic; b) dividing input print data into halftone cells of a predetermined pattern to produce halftone-cell data for each of the halftone cells; c) sequentially diffusing the error data of a halftone cell over halftone-cell data of another halftone cell using a predetermined distribution ratio from the halftone cell to the other halftone cell to correct halftone-cell data of each of the halftone cells; and d) producing dither data of each of the halftone cells from corrected halftone-cell data thereof.

BRIEF DESCRIPTION OF THE DRAWINGS

FIG. 2A is a diagram showing an example of a halftone cell;

FIG. 2B is a diagram showing an example of a set of halftone cells;

FIG. 2C is a schematic diagram showing an arrangement of the halftone cells of FIG. 2B;

FIG. 3 is a diagram showing an example of the contents of a data correction table as shown in FIG. 1;

FIG. 5 is a diagram illustrating a set of halftone cells for explanation of the image correction performed by the image correcting section as shown in FIG. 1;

DETAILED DESCRIPTION OF THE PREFERRED EMBODIMENTS

Figure 1:
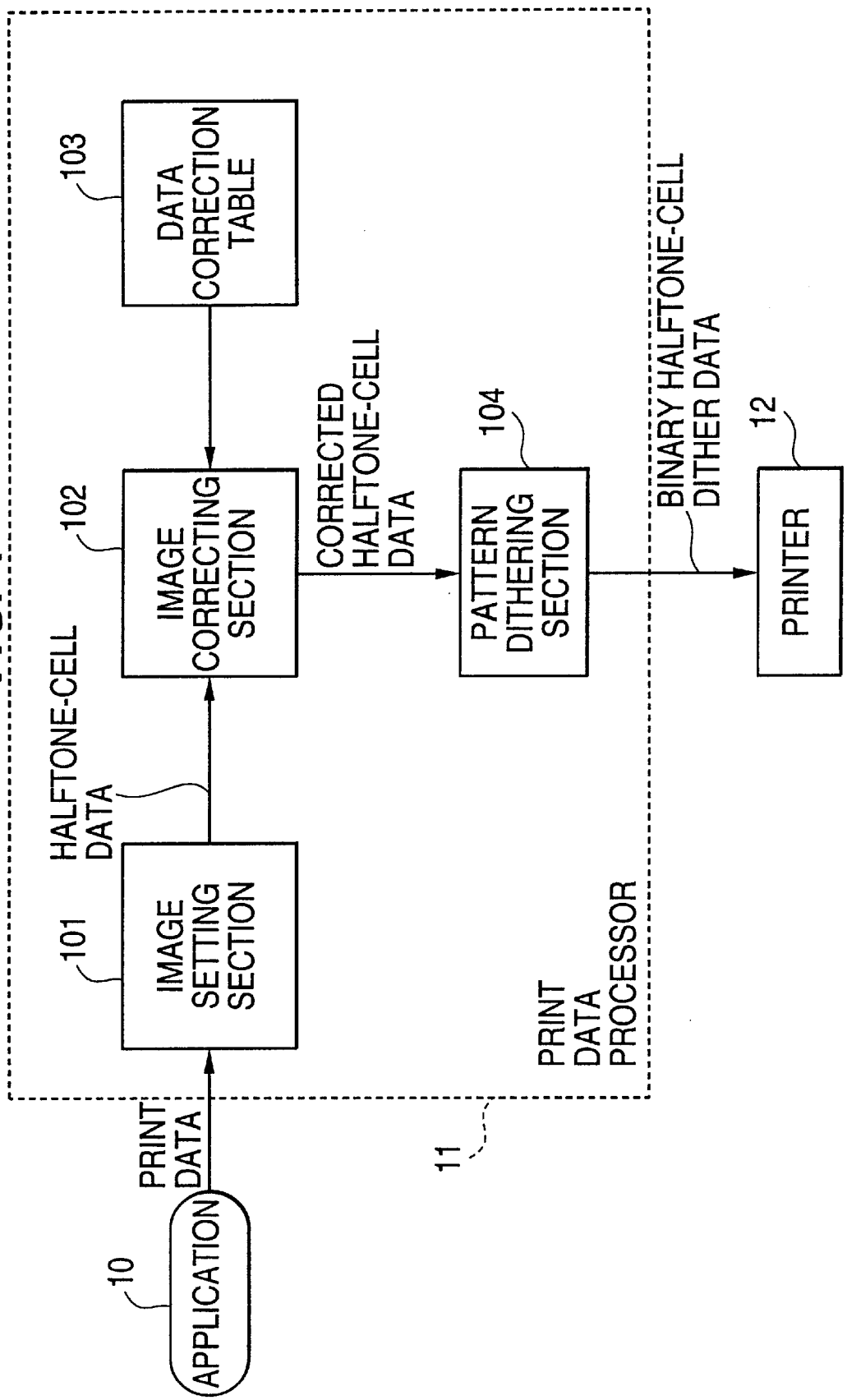
FIG. 1 is a block diagram illustrating a print data processing apparatus according to an embodiment of the present invention.

Referring to FIG. 1, a printer system is composed of an application 10 running on a computer, a print data processor 11 according to the present invention, and a printer 12 for printing the output data of the print data processor 11.

The print data processor 11 employs a combination of the halftone scheme and the error diffusion scheme. An image setting section 101 divides print data received from the application 10 into patterns for representing halftones. The halftone patterns are then corrected by an image correcting section 102 referring to a data correction table 103. The data correcting table 103 previously stores corrective data produced based on the input-output characteristic that is obtained in a case where input data is printed without correction. In other words, the data correction table 103 defines errors between theoretical values and the actual print results that are obtained when input data is printed without correction by pattern dithering.

The image correcting section 102, while referring to the data correction table 103, diffuses an appropriate error over input data or print data of adjoining halftone cells. Similarly, each of the adjoining halftone cells to which the diffused error data bas been added, while referring to the data correction table 103, diffuses an appropriate error over input data of further adjoining halftone cells. Repeating this process can insure multi-gradation and high-quality printing with less graininess appearance and good halftone reproducibility even when each halftone cell consists of fewer dots. Further, the processing time can be shortened by executing data processing pattern by pattern and using the data correction table 103 in correcting data. Corrected and optimized print data is converted into two-level print data by a pattern dithering section 104 before it is printed on the printer 12.

IMAGE SETTING SECTION

According to the embodiment, faster processing and high-quality quality printing are achieved at the same time. Threshold values are set dot by dot and the input print data is segmented into patterns of halftone cells. Thereafter, the input print data for each halftone cell is compared with the threshold values pattern by pattern to thereby form halftone-cell data.

As shown in FIG. 2A, it is assumed that each halftone cell is a 4×4 matrix of development dots numbered 1 to 16 in development sequence and therefore, according to prior art, seventeen halftone levels 0 to 16 are obtained for each halftone cell. As shown in FIG. 2B, a page of the print data is divided into arranged patterns of halftone cells. As shown in FIG. 2C, for simplicity, the following description will be given of, as an example, a case where a page of the print data is divided into six halftone cells S1–S6. Such a pattern of halftone cells and the matrix of each halftone cell are predetermined by the pattern dithering section 104.

Here, the print data is assumed to have halftone levels of eight bits, that is, 0 to 255, for each halftone cell. Therefore, the image setting section 101 divides the input print data according to the pattern of halftone cells to produces the halftone-cell data of 256 halftone levels in halftone cells.

DATA CORRECTION TABLE

As shown in FIG. 3, the data correction table 103 stores the corrective data indicating the relationship between an input halftone level x and an output halftone level a. The corrective data is used to adjust the halftone-cell data according to an image correction procedure as will be described later.

The corrective data is obtained as described hereinafter. Since the print data has the 256 halftone levels (0–255) and each halftone cell normally has the 17 halftone levels (0–16), the 17 halftone levels (0–16) for each halftone cell are uniformly assigned to the 256 halftone levels 0 to 255 to reproduce the print image.

Figure 4A:
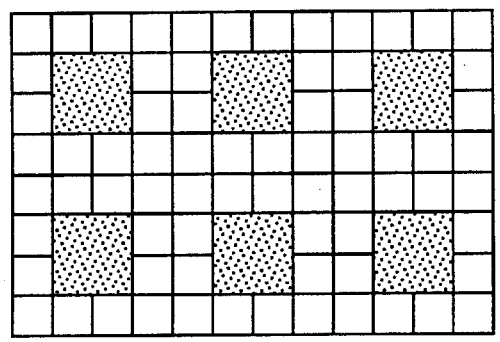
FIG. 4A is a diagram showing a developed state in the case of ideal development.
Figure 4B:
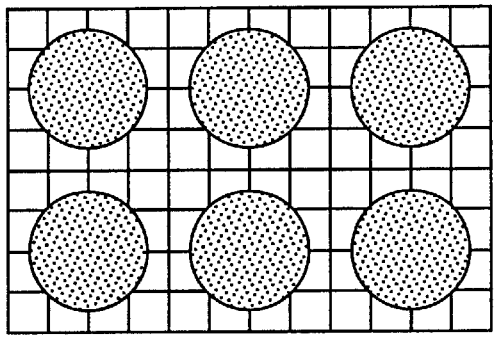
FIG. 4B is a diagram showing a developed state in the case of actual development.

As shown in FIGS. 4A and 4B, assuming that the print data has six halftone cells each printed 25% (64/256), if without correction, data is generally printed at a higher density as shown in FIG. 4B as compared with the ideal developed state as shown in FIG. 4A. By measuring such a characteristic (dot gain) for all the reproducible seventeen halftone levels after printing, a relationship between input halftone levels and output halftone levels, or an input/output characteristic (an ideal gamma characteristic and an actual gamma characteristic) as shown in FIG. 4C is acquired.

Figure 4C:
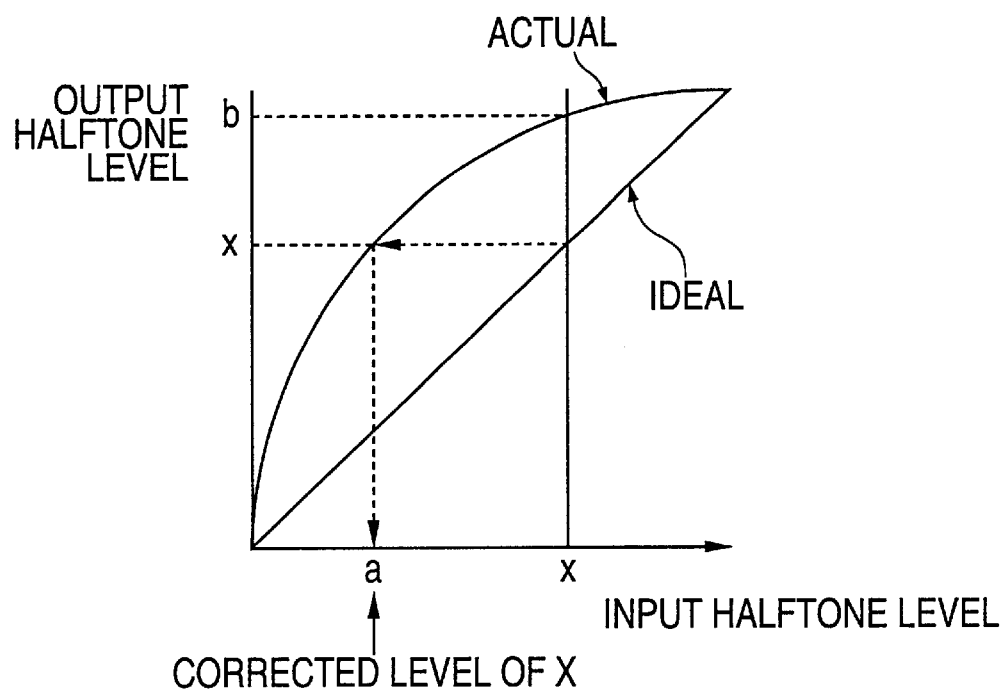
FIG. 4C is a diagram illustrating ideal and actual characteristics of output halftone levels with respect to input halftone values.

Referring to FIG. 4C, with a value "x" given as an input halftone level, "b" is the output result according to the actual gamma characteristic, but it is apparent that a value "a" should be input for the actual gamma characteristic to acquire an output "x" which is the same as the input halftone level. The data correction table 103 stores this relationship for inputs of eight bits as shown in FIG. 3. While ideal input/output characteristic can be acquired by correcting the input value "x" to the input value "a" using the data correction table 103, the following two disadvantages would arise:

a) The halftone displaying capability is limited to the number of dots (17 dots in this example) that constitute a halftone cell; and b) Since input data is merely shifted in halftone level, the halftone correction produces invalid dither patterns, thus decreasing the number of displayable halftone levels.

To overcome those two problems, the image correcting section 102 performs image correction as described hereinafter.

IMAGE CORRECTION

As shown in FIG. 5, consider the case where six halftone cells S1–S6 each have a density of x(0) before correction and then the respective densities of the halftone cells S1–S6 are changed from the initial density x(0) to x(1), x(m), x(n), x(o), x(p) and x(q) by the image correcting section 102 referring to the data correction table 103.

More specifically, the error between the input halftone level x(0) and the corresponding halftone level as for the halftone cell S1 is diffused over adjoining other five halftone cells S2 to S6 based on the following correction calculation formulae:

$x(l)=x(0),$ $x(m)=x(0)-(x(0)-a0)/k1,$ $x(n)=x(0)-(x(m)-am)/k1-(x(0)-a0)/k2,$ $x(o)=x(0)-(x(0)-a0)/k3,$ $x(p)-x(0)-(x(o)-ao)/k1-(x(m)-am)/k3-(x(0)-a0)/k4,$ and $x(q)-x(0)-(x(p)-ap)/k1-(x(o)-ao)/k2-(x(n)-an)/k3-((x(m)-am)/k4-(x(0)-a0)/k5,$ where k1–k5 are distribution ratios determined depending on the characteristic of a printer device in use. More specifically, k1–k5 are as follows:

k1 is a distribution ratio between a halftone cell and the adjacent halftone cell in the secondary scan direction (e.g. from cell S1 to cell S2, from cell S2 to cell S3), k2 is a distribution ratio between a halftone cell and the next halftone cell but one in the secondary scan direction (e.g. from cell S1 to cell S3, from cell S4 to cell S6), k3 is a distribution ratio between a halftone cell and the adjacent halftone cell in the primary scan direction (e.g. from cell S1 to cell S4, from cell S2 to cell S5), k4 is a distribution ratio between a halftone cell and the adjacent halftone cell in the diagonal direction of slope −1 with respect to the secondary scan direction (e.g. from cell S1 to cell S5, from cell S2 to cell S6), and k5 is a distribution ratio between a halftone cell and the next halftone cell in the direction of slope −½ with respect to the secondary scan direction (e.g. between cells S1 and S6).

In other words, for x(1), x(0) is used as it is without correction. In this case, to output the ideal level of x(0) from the data correction table 103, it is necessary to input a0. Therefore, an error (x(0)−a0) has been generated for the cell of x(1). This error is distributed over x(m), x(n), x(o), x(p) and x(q).

For each of x(m), x(n), x(o), x(p) and x(q), it is repeatedly performed to add the diffused level input from the adjoining cell and then further to diffuse an error of its input level over adjoining cells by referring to the data correction table 103.

In general, the corrected halftone-cell data x(i) for an i-th halftone cell Si (i is an integer) is calculated by the following equation:

$$x(i) = xo(i) - \sum_j (x(j) - a(j))/k(i, j)$$

wherein xo(i) is halftone-cell data of the i-th halftone cell before correction and k(i,j) is a distribution ratio from the j-th halftone cell to the i-th halftone cell.

In this manner, the errors diffused from other cells are accumulated to determine the halftone levels of adjoining halftone cells. This process can achieve an ideal gradation reproducibility and can ensure reproduction of 8-bit gradation levels (256 gradation levels) even though each halftone cell consists of sixteen dots. Although the foregoing description has been given a case where an error is diffused over adjoining five halftone cells S2–S5, diffusion is not restricted to this particular way. The diffusion scheme and distribution ratios between cells should be determined depending on the characteristic of the printer device, especially, of the photosensitive body thereof.

Figure 6A:
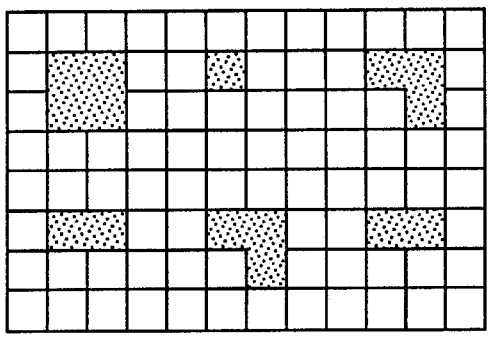
FIG. 6A is a diagram showing an example of the dither pattern generated from corrected print data at the time of exposure according to the present invention.

As shown in FIG. 6A, such image correction may provide different exposures from halftone cell to halftone cell on the photosensitive body. For example, the halftone cell S1 has a dither pattern of four dots at dot positions 1–4 formed by laser exposure and the halftone cell S2 has a different dither pattern of one dot at dot position 1 formed. Further, the halftone cell S4 has a different dither pattern of two dots at dot positions 1 and 2 formed.

Figure 6B:
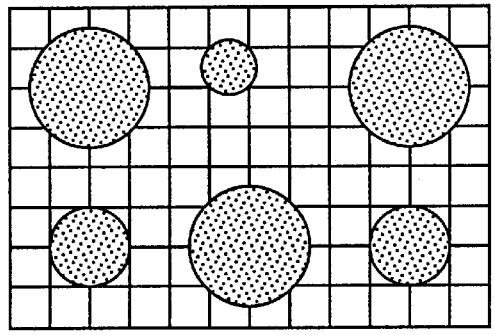
FIG. 6B is a diagram showing the actual development result of the dither pattern as shown in FIG. 6A.

As shown in FIG. 6B, such different patterns of dots to be printed are developed by the developing process to form toner dots having different sizes halftone cell by halftone cell as a consequence, thus providing an ideal halftone characteristic as a whole. As compared with the case of printing data without correction as shown in FIGS. 4A and 4B, a high-density portion is prevented from becoming too dark due to the interference of the photosensitive body and the greater number of halftone levels is achieved.

ANOTHER EMBODIMENT

In the case as shown in FIG. 4C, an ideal gamma characteristic which makes an input halftone level and an output halftone level equal to each other is used as a target gamma characteristic. Alternatively, it is possible to use a plurality of desired target gamma characteristic curves to produce desired corrective data to be stored in the data correction table 103.

Figure 7:
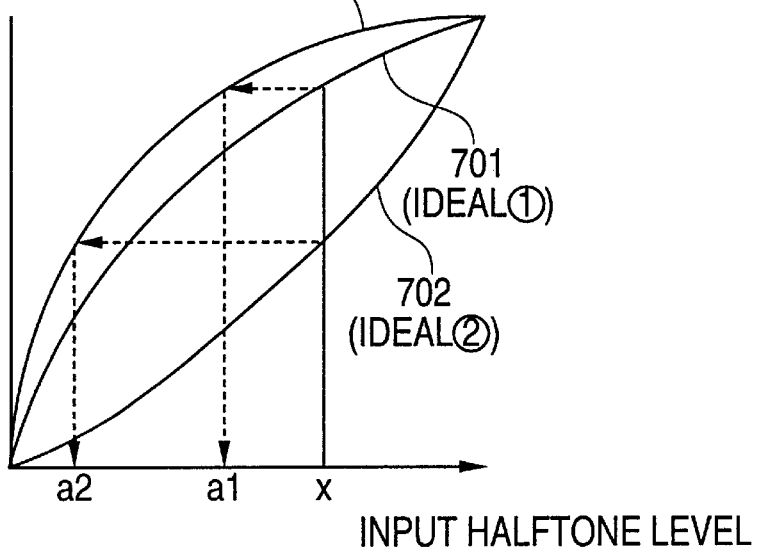
FIG. 7 is a diagram illustrating ideal and actual characteristics of output halftone levels with respect to input halftone volume according to another embodiment of the present invention.

As shown in FIG. 7, assuming that first and second target gamma characteristics 701 and 702 are used as ideal characteristics. In this case, corrected halftone levels a1 and a2 are obtained from the data correction table 103 based on the gamma characteristics 701 and 702, respectively. Therefore, a desired gamma characteristic can be obtained by selecting a desired one of the gamma characteristics 701 and 702 to match the printer setting.

According to the present invention, as described above, correction is performed in such a way as to eliminate an error caused by dot gain based on dot gain data obtained when printing is done without correction, resulting in improved halftone reproducibility. Further, correction is made by diffusing an error between actual and target input/output halftone data over print data of adjoining halftone cells, so that the increased number of halftone levels can be implemented even when each halftone cell consists of fewer dots and halftone cells can be arranged at a high density. This can provide an effect of ensuring high-quality printing with less graininess or dot-dispersed appearance.

When an error between actual and target input/output gradation data is diffused halftone cell by halftone cell, it is unlikely to produce independent single dots which would be present by ordinary error diffusion. This results in stable development, thus ensuring stable print quality. Furthermore, segmenting print data to patterns of halftone cells before data processing can reduce the amount of data to be processed, as compared with a case where print data is processed dot by dot. This can result in an improved printing speed.

Although the two embodiments of the present invention has been described herein, it should be apparent to those skilled in the art that the present invention may be embodied in many other specific forms without departing from the spirit or scope of the invention. Therefore, the present example and embodiment are to be considered as illustrative and not restrictive and the invention is not to be limited to the details given herein, but may be modified within the scope of the appended claims.

What is claimed is:

1. A print data processing method for a printing device, comprising the steps of:

a) storing error data in halftone level between an actual halftone characteristic of the printing device and a target halftone characteristic;

b) dividing input print data into halftone cells of a predetermined pattern to produce halftone-cell data for each of the halftone cells;

c) sequentially diffusing the error data of a halftone cell over halftone-cell data of another halftone cell using a predetermined distribution ratio from the halftone cell to the other halftone cell to correct halftone-cell data of each of the halftone cells; and d) producing dither data of each of the halftone cells from corrected halftone-cell data thereof.

2. The print data processing method according to claim 1, wherein the target halftone characteristic is set to an ideal gamma characteristic which makes an input halftone level and an output halftone level equal to each other.

3. The print data processing method according to claim 1, wherein the target halftone characteristic is set to a predetermined gamma characteristic which makes an input halftone level and an output halftone level different from each other.

4. The print data processing method according to claim 1, wherein the target halftone characteristic is selected from a plurality of predetermined gamma characteristics.

5. The print data processing method according to claim 1, wherein the step c) comprises the steps of:
- c-1) determining first error data of a first halftone cell from first halftone-cell data thereof;
- c-2) correcting second halftone-cell data of a second halftone cell by subtracting a first corrective value from the second halftone-cell data to produce corrected second halftone-cell data, wherein the first corrective value is obtained based on the first error data and a first predetermined distribution ratio from the first halftone cell to the second halftone cell; and
- c-3) sequentially repeating the steps c-1) and c-2) to diffuse the error data of a halftone cell over halftone-cell data of another halftone cell to correct halftone-cell data of each of the halftone cells.

6. The print data processing method according to claim 1, wherein the step c) comprises the step of calculating corrected halftone-cell data x(i) of a halftone cell using the following equation:

$$x(i) = xo(i) - \sum_j (x(j) - a(j))/k(i, j)$$

wherein xo(i) is halftone-cell data of the i-th halftone cell before correction and k(i,j) is a distribution ratio from the j-th halftone cell to the i-th halftone cell.

7. A print data processing apparatus for a printing device, comprising:
- a memory for storing a data correction table containing error data in halftone level between an actual halftone characteristic of the printing device and a target halftone characteristic;
- an image divider for dividing input print data into halftone cells of a predetermined pattern to produce halftone-cell data for each of the halftone cells;
- an image correction processor for sequentially diffusing the error data of a halftone cell over halftone-cell data of another halftone cell using a predetermined distribution ratio from the halftone cell to the other halftone cell to correct halftone-cell data of each of the halftone cells; and
- a pattern dithering processor for producing dither data of each of the halftone cells from corrected halftone-cell data thereof.

8. The print data processing apparatus according to claim 7, wherein the target halftone characteristic is set to an ideal gamma characteristic which makes an input halftone level and an output halftone level equal to each other.

9. The print data processing apparatus according to claim 7, wherein the target halftone characteristic is set to a predetermined gamma characteristic which makes an input halftone level and an output halftone level different from each other.

10. The print data processing apparatus according to claim 7, wherein the target halftone characteristic is selected from a plurality of predetermined gamma characteristics.

11. The print data processing apparatus according to claim 7, wherein the image correction processor determines first error data of a first halftone cell from first halftone-cell data thereof and corrects second halftone-cell data of a second halftone cell by subtracting a first corrective value from the second halftone-cell data to produce corrected second halftone-cell data, wherein the first corrective value is obtained based on the first error data and a first predetermined distribution ratio from the first halftone cell to the second halftone cell to diffuse the error data of a halftone cell over halftone-cell data of another halftone cell to correct halftone-cell data of each of the halftone cells.

12. The print data processing apparatus according to claim 7, wherein the image correction processor calculates corrected halftone-cell data x(i) of a halftone cell using the following equation:

$$x(i) = xo(i) - \sum_j (x(j) - a(j))/k(i, j)$$

wherein xo(i) is halftone-cell data of the i-th halftone cell before correction and k(i,j) is a distribution ratio from the j-th halftone cell to the i-th halftone cell.

* * * * *